(No Model.)
A. WEYER.
FURNACE FOR MELTING AND ANNEALING GLASS.
No. 245,248. Patented Aug. 2, 1881.
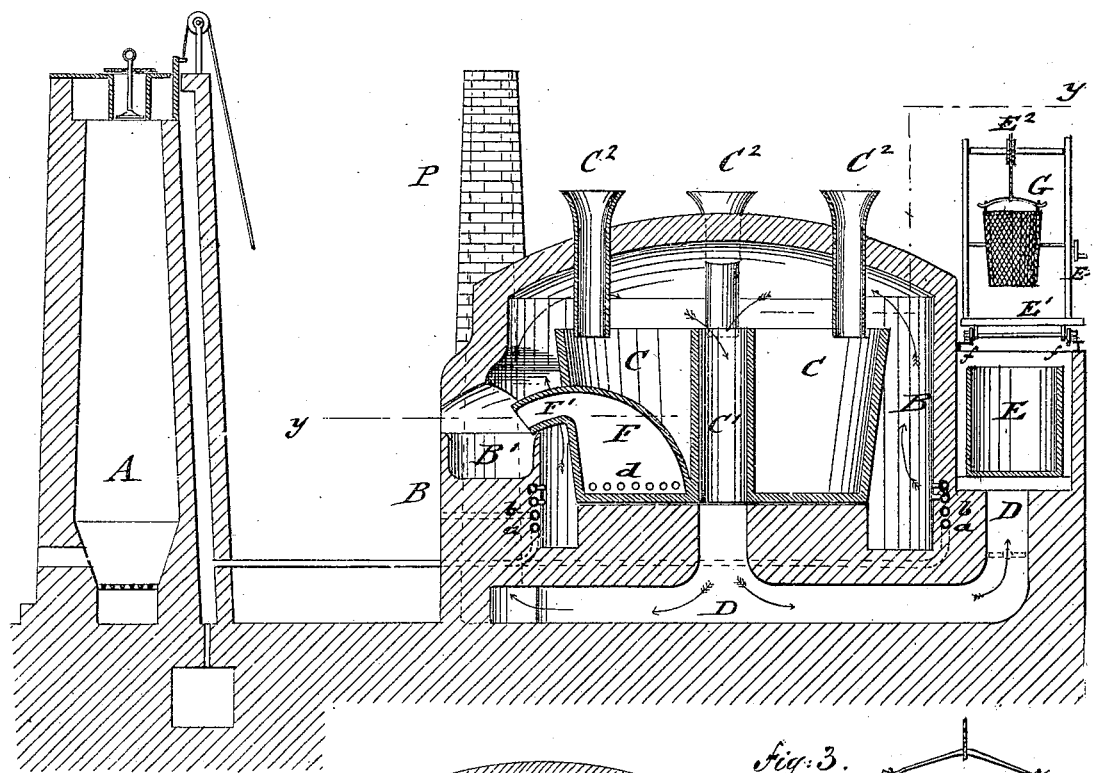
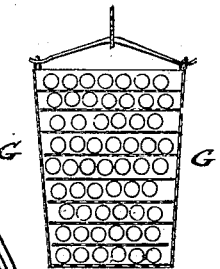
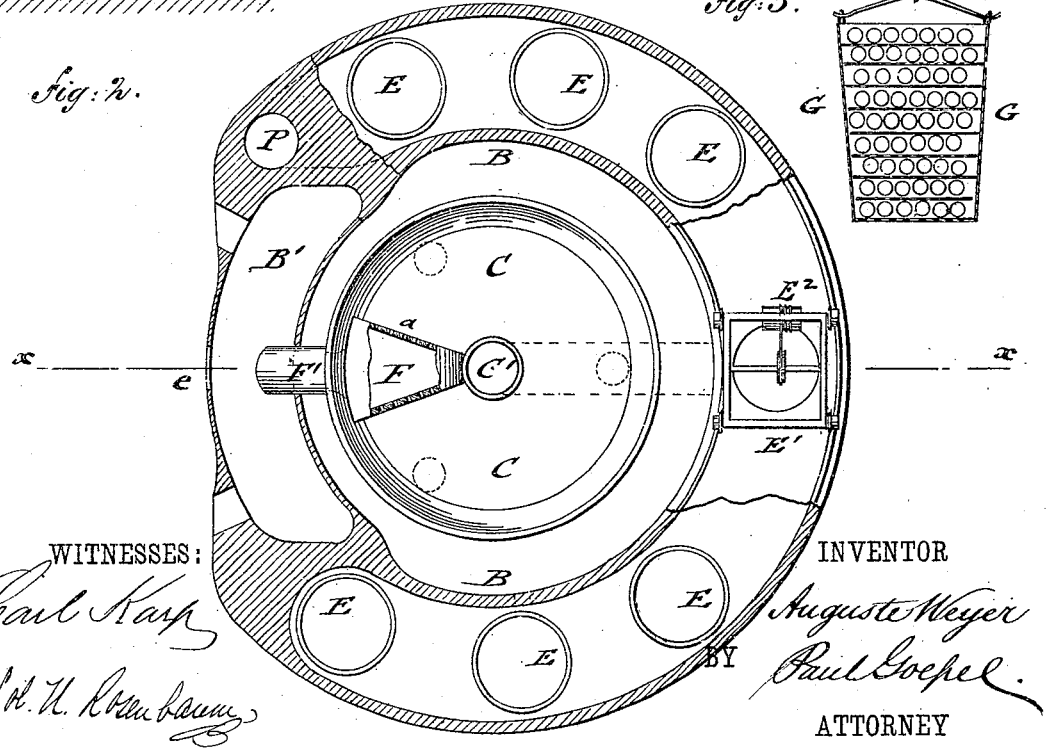
WITNESSES:
INVENTOR
Auguste Weyer
BY Paul Goepel.
ATTORNEY

UNITED STATES PATENT OFFICE.

AUGUSTE WEYER, OF BROOKLYN, ASSIGNOR TO ETIENNE DUFEZ, OF NEW YORK, N. Y.

FURNACE FOR MELTING AND ANNEALING GLASS.

SPECIFICATION forming part of Letters Patent No. 245,248, dated August 2, 1881.

Application filed March 7, 1881. (No model.)

*To all whom it may concern:*

Be it known that I, AUGUSTE WEYER, of Brooklyn, in the county of Kings and State of New York, have invented certain new and useful Improvements in Furnaces for Melting and Annealing Glass, of which the following is a specification.

This invention has reference to an improved furnace for melting and annealing glass, which is heated by gases generated in a separate furnace, the gases being first employed for melting the glass, and, lastly, for annealing the articles made therefrom, so that they acquire greater elasticity, a more homogeneous structure, and a higher degree of resistance to changes of temperature and sudden shocks.

Another important feature of my invention is that by my furnace a continuous melting and drawing off of the glass can be kept up, and simultaneously therewith the finished articles be annealed in such a manner that the heat of the burning gases may be utilized in a higher degree and the furnace be run with a considerable saving of fuel as compared to the present separate furnaces employed for melting and annealing hollow glassware.

The articles for which my furnace is specially adapted are lamp-chimneys, lamp-globes, water-gages, and other articles, which, when in use, are exposed to considerable changes of temperature and to sudden shocks or vibrations.

My invention consists, first, of a melting-pot of certain construction to which a continuous supply of vitreous material is kept by means of hoppers and conducting-trunks, which extend through the arched top of the furnace down into the pot. From the pot the melted glass is collected in a retort which extends from the center of the pot and through the side wall of the same to the delivery-reservoir. The retort is provided with holes in the side walls near the bottom of the pot.

The invention consists further in conducting the air and the fire-gases generated in a separate furnace through flues in the outer wall of the melting-furnace, then burning them in an annular space around the melting-pot, and conducting the gases of combustion over the melting-pot and through a central cylindrical flue of the same to a circular flue, passing below a series of annealing-vessels placed outside and around the melting-furnace. The annealing-vessels are filled with brine, into which the articles to be annealed are plunged by means of wire crates and a suitable hoisting mechanism, which is placed on wheels and moved from vessel to vessel on rails arranged at both sides of the annealing-vessels.

My invention consists, lastly, in the process of annealing the hollow glass articles by successively plunging them into baths of certain fixed temperatures, as will be described more fully hereinafter.

In the accompanying drawings, Figure 1 represents a vertical central section of my improved furnace for melting and annealing glass on line $x\ x$, Fig. 2. Fig. 2 is a horizontal section of the same on line $y\ y$, Fig. 1; and Fig. 3 is a detail vertical central section of one of the wire crates for immersing the glassware into the annealing-baths.

Similar letters of reference indicate corresponding parts.

In working my glass melting and annealing furnace I prefer to heat the same by gases, which are generated in a separate furnace, A. This gas-generating furnace A may be of any approved construction and erected at any suitable distance from the glass-melting furnace B. The gases are conducted from the generating-furnace to the glass-melting furnace by connecting flues which communicate with flues $a$, that are arranged in the outer circular wall of the furnace. Air-flues $b$ alternate with the gas-conducting flues $a$, the flues serving to raise the air and gases to a higher temperature before emitting them into the annular space around the melting-pot C. Both the gas and air flues are arranged to extend twice or three times around the furnace B, and are emitted at two or more points to the interior of the glass-melting furnace B, where they mingle and burn with intense heat. The heating-flame envelopes entirely the melting-pot C, which is open at the top and provided at the center with a vertical flue, C', through which the gases of combustion pass downward through the center of the pot, being then conducted from the same and through a circular flue, D, in the exterior wall of the furnace below and around a series of annealing-vessels, E, arranged above the same, and finally to the chimney P. The melting-pot C is acted upon at the side, top, and center by the intense heat of the burning gases, which melts the vitreous materials that are fed to the same by means of the supply-hoppers and trunks $C^2$, the latter extending through the arched top of the furnace down into the melting-pot C. The hoppers and trunks $C^2$ have to be charged with vitreous materials as fast as the same are fed down to the pot, care being taken that the hoppers are always well filled, so that no air can enter from the outside to the interior of the furnace B. As soon as the vitreous materials are delivered into the pot and melted by the heat at the interior of the furnace another quantity is fed gradually down into the pot, thus keeping up a regular and uniform supply. The liquid glass which is formed by the vitreous materials in the pot C passes into a retort-shaped receptacle, F, which extends from the central flue, C', to and through the outer wall of the melting-pot C.

The walls of the retort F are provided near the bottom of the pot with perforations $d$, through which the melted glass enters, so as to rise to the same level in the retort B as in the melting-pot. The curved neck F' of the retort extends through the space between the pot C and the outer wall of the furnace and discharges the melted glass into a reservoir, B', in the encircling wall, from which it is drawn off by the glass-blowers through a central opening, $e$.

The proper temperature within the reservoir B' is kept up by side openings, $e'$, through which the air may enter to the glass, so that the same can be taken up by the blowers at the required temperature, the same being lower than at the inside of the pot, so that the glass flows less easily and is better adapted for blowing. In this manner a continuous supply of melted glass may be furnished, and consequently the uninterrupted blowing of hollow glassware be kept up. Thus one pot can furnish the same quantity of glass, at a less expense for fuel, as three of the old-style pots.

The annealing-vessels E are of cylindrical shape, and are made of cast-iron of suitable thickness. They are arranged in the outer circular wall around the melting-pot, circular rails $f$ being arranged at both sides of the vessels E to support a carriage, E', upon which a hoisting mechanism, $E^2$, is arranged, that serves to raise or lower the cylindrical wire crates G, within which the articles to be annealed are placed in tiers, each tier being separated from the next adjoining ones by means of wire screens, as shown in Fig. 3. The annealing-vessels E are partly filled with a solution of a suitable salt, the temperature of which is regulated by means of properly-arranged dampers in the heating-flue D, the heat being thrown as required around any one or more of the annealing-vessels.

The temperature in the annealing-vessels is indicated by means of pyrometers of suitable construction.

The glass articles which have to be annealed are, after they are blown, allowed to cool down entirely before they are placed into the wire crates. When they are properly arranged therein the crates are plunged, by means of the movable carriage and lowering apparatus, into the annealing-baths. The solution of salt employed must be capable of attaining a temperature of 900° Fahrenheit, and must not get solid at a lower temperature than from 500° to 600° Fahrenheit. The articles to be annealed are submerged into the bath when the same is at its lowest temperature—say 600°—after which the same is raised as quickly as possible to the highest temperature, of 900°. The crate is then withdrawn from the annealing-vessel and plunged into a second annealing-vessel, to which a temperature of 700° Fahrenheit has been imparted. In this second annealing-vessel the articles are allowed to remain for about twenty-five to thirty minutes, after which they are removed and plunged into a third annealing-vessel, which is at the moment of submerging the articles at its lowest temperature, but which is raised to 800°, after which the temperature is gradually allowed to fall down to the point of solidification of the solution, upon which the articles are withdrawn. By exposing in this manner the articles to be annealed successively to the action of the different temperatures described in three separate annealing-vessels, a more homogeneous texture and greater elasticity of the glass results, so that the articles are capable of resisting in a high degree changes of temperature, shocks, vibrations, and other strains to which they may be exposed.

Having thus described my invention, I claim as new and desire to secure by Letters Patent—

1. A glass melting and annealing furnace consisting of a central melting-pot having a collecting and discharging retort for the melted glass, and of a series of exterior annealing-vessels, arranged to be heated by the gases of combustion of the same, substantially as and for the purpose set forth.

2. In a glass melting and annealing furnace, the combination of a central melting-pot having a collecting-retort and curved neck extending from the center and through to the wall of the pot, with a reservoir for the glass in the exterior wall of the furnace, said reservoir having discharge and temperature-regulating orifices, substantially as described.

3. The combination, in a glass melting and annealing furnace, of a central melting-pot having a vertical central flue, with gas and air supply channels arranged in the outer walls of the furnace, and with conduit-flues which pass below the annealing-vessels and then to the chimney, substantially as specified.

4. The combination, in a glass melting and annealing furnace, of a series of annealing-vessels arranged around the melting-furnace, with guide-rails running alongside of the annealing-vessels, with a traversing carriage and hoisting device for raising or lowering the wire crates containing the glass articles into or out of the vessels, substantially as set forth.

5. The method herein described of annealing articles of glass, consisting in successively plunging the same first into a solution of salt and raising the temperature of the same quickly to 900° Fahrenheit, then transferring the glassware into a second bath and keeping the same for a longer period at a temperature of 700° Fahrenheit, then transferring the glassware to a third bath and raising it to a temperature of 800° Fahrenheit, allowing the latter bath to gradually cool down to near its point of solidification, and then withdrawing the articles, substantially as and for the purpose set forth.

In testimony that I claim the foregoing as my invention I have signed my name, in presence of two witnesses, this 9th day of February, 1881.

AUGUSTE WEYER.

Witnesses:
PAUL GOEPEL,
CARL KARP.